United States Patent

Russ et al.

[11] Patent Number: 5,496,381
[45] Date of Patent: Mar. 5, 1996

[54] MIXTURES OF FIBER-REACTIVE DYES AND USE THEREOF FOR DYEING FIBER MATERIALS

[75] Inventors: Werner H. Russ, Flörsheim; Kurt Hussong, Bad Soden, both of Germany

[73] Assignee: Hoechst AG, Germany

[21] Appl. No.: 308,707

[22] Filed: Sep. 19, 1994

[30] Foreign Application Priority Data

Sep. 21, 1993 [DE] Germany .................. 43 32 048.1

[51] Int. Cl.$^6$ .................. C09B 67/22; C09B 67/24; D06P 1/38; D06P 3/10
[52] U.S. Cl. .................. 8/549; 8/638; 8/641; 8/643; 8/918; 8/924; 8/68.2; 8/687; 8/676
[58] Field of Search .................. 8/549, 641, 643, 8/917, 918, 924, 925, 638, 682, 687, 676

[56] References Cited

U.S. PATENT DOCUMENTS

| | | |
|---|---|---|
| 5,071,442 | 12/1991 | Luttringer et al. |
| 5,254,136 | 9/1993 | Fujii et al. .................. 8/549 |
| 5,290,922 | 3/1994 | Springer et al. |
| 5,349,057 | 9/1994 | Büch et al. |

FOREIGN PATENT DOCUMENTS

| | | |
|---|---|---|
| 0437184 | 7/1991 | European Pat. Off. |
| 0525805 | 2/1993 | European Pat. Off. |
| 0576026 | 12/1993 | European Pat. Off. |
| 1333248 | 10/1973 | United Kingdom |
| 9013603 | 11/1990 | WIPO |
| 9201021 | 1/1992 | WIPO |

Primary Examiner—Margaret Einsmann
Attorney, Agent, or Firm—Connolly & Hutz

[57] ABSTRACT

Novel dye mixture comprising three to seven fiber-reactive dyes selected from dyes of the below-indicated and defined formulae (1) to (7) with the proviso that the dye mixture contain at least one representative of the formulae (1) and/or (2), at least one representative of the formulae (3) and/or (4) and at least one representative of the formulae (5) and/or (6) and/or (7):

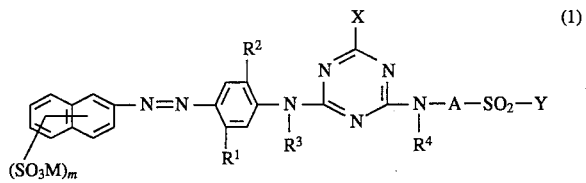

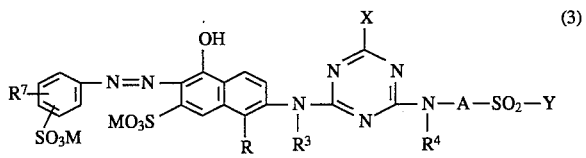

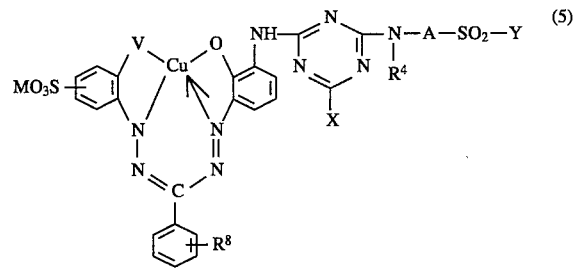

20 Claims, No Drawings

MIXTURES OF FIBER-REACTIVE DYES AND USE THEREOF FOR DYEING FIBER MATERIALS

The invention relates to the field of fiber-reactive dyes.

Dyeings with fine gradations of shade are produced using dyebaths, dyeing liquors, print pastes, etc. based on mixtures of dyes which differ in color, especially mixtures of dyes of yellow, red and blue color. It is important in this connection, especially if the dye mixtures are to be applied by an exhaust method, that the dyes should ideally possess a constant similarity in dyeing characteristics, i.e. a very similar exhaustion and migration capacity and a very high and comparable degree of fixation (build-up) and similar stability, in order that the reproducibility of the desired shade and the same appearance may be ensured even in the case of prolonged dyeing and printing processes. In addition, the individual dyes should ideally have the same fastness properties.

European Patent Application Publication No. 0 525 805 discloses dye mixtures consisting of at least five fiber-reactive dyes.

The present invention now provides novel dye mixtures comprising three to seven, preferably four to seven, fiber-reactive dyes selected from dyes of the below-indicated and -defined formulae (1) to (7) with the proviso that the dye mixture contain at least one representative of the formulae (1) and/or (2), at least one representative of the formulae (3) and/or (4) and at least one representative of the formulae (5) and/or (6) and/or (7).

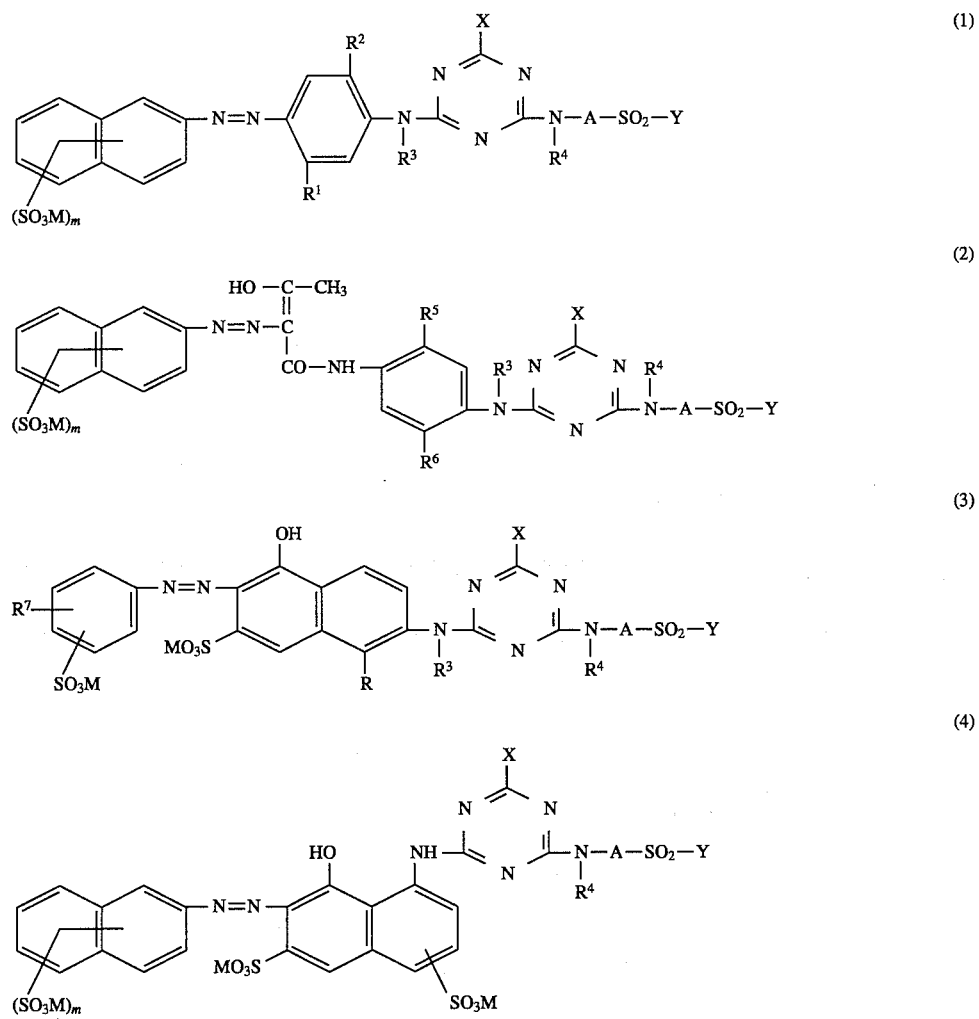

(5)

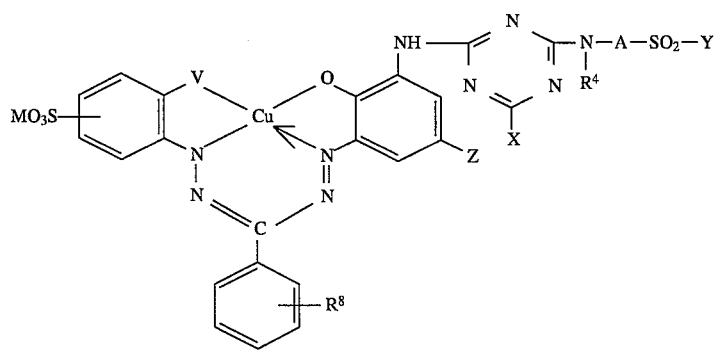

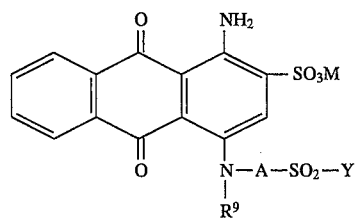

(6)

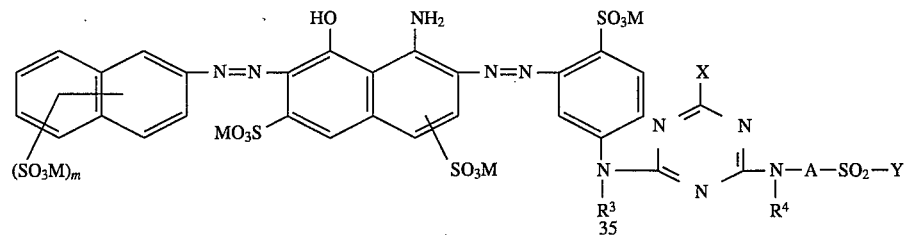

(7)

where

M is hydrogen or an alkali metal, such as sodium, potassium or lithium;

m is 1, 2 or 3;

X is cyanoamino, alkoxy of i to 4 carbon atoms, such as ethoxy and in particular methoxy, or alkoxy of 2 to 4 carbon atoms, such as ethoxy and propoxy, substituted by alkoxy of i to 4 carbon atoms, such as methoxy, ethoxy or propoxy, preferably methoxy and in particular cyanoamino;

Y is vinyl or is ethyl which contains in the β-position a substituent which is eliminable by alkali with the formation of the vinyl group;

Z is hydrogen or $SO_3M$, wherein M is defined above $R^1$ is hydrogen, alkyl of 1 to 4 carbon atoms, such as ethyl and in particular methyl, alkoxy of 1 to 4 carbon atoms, such as ethoxy and in particular methoxy, alkanoylamino of 2 to 5 carbon atoms, such as acetylamino and propionylamino, or ureido;

$R^2$ is hydrogen, sulfo, alkyl of 1 to 4 carbon atoms, such as ethyl and in particular methyl, or alkoxy of 1 to 4 carbon atoms, such as ethoxy and in particular methoxy;

$R^3$ is hydrogen or alkyl of 1 to 4 carbon atoms, such as methyl, ethyl or propyl, which can be substituted, for example by hydroxyl, cyano, alkoxy of 1 to 4 carbon atoms, such as methoxy and ethoxy, carboxyl, carbamoyl, alkoxycarbonyl of 2 to 5 carbon atoms, such as carbomethoxy and carbethoxy, alkylcarbonyloxy of 2 to 5 carbon atoms, sulfo, sulfamoyl or halogen, such as chlorine or bromine;

$R^4$ is hydrogen or alkyl of 1 to 4 carbon atoms, such as methyl, ethyl or propyl, which can be substituted, for example by hydroxyl, cyano, alkoxy of 1 to 4 carbon atoms, such as methoxy and ethoxy, carboxyl, carbamoyl, alkoxycarbonyl of 2 to 5 carbon atoms, such as carbomethoxy and carbethoxy, alkylcarbonyloxy of 2 to 5 carbon atoms, sulfo, sulfamoyl or halogen, such as chlorine or bromine, or is phenyl which can be substituted by 1 or 2 substituents selected from the group consisting of sulfo, methyl, ethyl, methoxy, ethoxy and carboxyl;

A is alkylene of 2 to 6 carbon atoms, preferably of 2 or 3 carbon atoms, such as ethylene and n-propylene, which can be substituted, for example by hydroxyl, alkoxy of 1 to 4 carbon atoms, such as methoxy and ethoxy, sulfo, carboxyl, halogen, such as chlorine or bromine;

R is hydrogen or sulfo;

$R^5$ is hydrogen, sulfo, alkyl of 1 to 4 carbon atoms, such as ethyl and in particular methyl, or alkoxy of 1 to 4 carbon atoms, such as ethoxy and in particular methoxy;

$R^6$ is hydrogen, sulfo, alkyl of 1 to 4 carbon atoms, such as ethyl and in particular methyl, or alkoxy of 1 to 4 carbon atoms, such as ethoxy and in particular methoxy;

$R^7$ is hydrogen, alkyl of 1 to 4 carbon atoms, such as ethyl and in particular methyl, or alkoxy of 1 to 4 carbon atoms, such as ethoxy and in particular methoxy;

V is a carbonyloxy group of the formula —CO—O— or an oxy group of the formula —O—;

$R^8$ is hydrogen, methyl, ethyl, nitro, sulfo or chlorine;

$R^9$ is phenyl, monosulfophenyl or monocarboxyphenyl; the one —$SO_3M$ group in the formula (4) and in the formula (7) is attached to the naphthalene nucleus meta or para, preferably meta, to the amino group.

The individual symbols in the formulae mentioned above and also in the formulae mentioned hereinafter, including those having the same designation in a formula, can have, within the scope of their definition, meanings identical to or different from one another.

Alkali-eliminable substituents disposed in the β-position of the ethyl group of Y include for example halogen atoms, such as bromine and chlorine, ester groups of organic carboxylic and sulfonic acids, as of alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acid ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms in each, such as dimethylamino and diethylamino. Y is preferably β-sulfatoethyl or vinyl, particularly preferably β-sulfatoethyl.

The groups "sulfo", "carboxyl", "thiosulfato", "phosphato" and "sulfato" do not only include the acid form but also the salt form thereof. Accordingly, sulfo groups are groups conforming to the formula —$SO_3M$, carboxyl groups are groups conforming to the formula —COOM, thiosulfato groups are groups conforming to the formula —S—$SO_3M$, phosphato groups are groups conforming to the formula —$OPO_3M_2$, and sulfato groups are groups conforming to the formula —$OSO_3M$, in each of which M is as defined above.

Substituted and unsubstituted alkyl radicals $R^3$ and $R^4$ include for example methyl, ethyl, n-propyl, isopropyl, n-butyl, isobutyl, 2-methylpropyl, 2-hydroxyethyl, 2-hydroxypropyl, 3-hydroxypropyl, 2-hydroxybutyl, 3-hydroxybutyl, 4-hydroxybutyl, 2,3-dihydroxybutyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, 2-methylcarbonyloxyethyl, 2-ethylcarbonyloxyethyl, 3-methylcarbonyloxypropyl, 3-ethylcarbonyloxypropyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. Preferably $R^3$ is hydrogen, methyl or ethyl, in particular hydrogen, and $R^4$ is hydrogen, methyl, ethyl or phenyl. Preferably in the formula (5) the radical V is carbonyloxy. Preference is further given to the radical A being methylene, 1,2-ethylene or 1,3-propylene.

Of the dyes of the formula (1) preference is given to the dyes of the formula (1A)

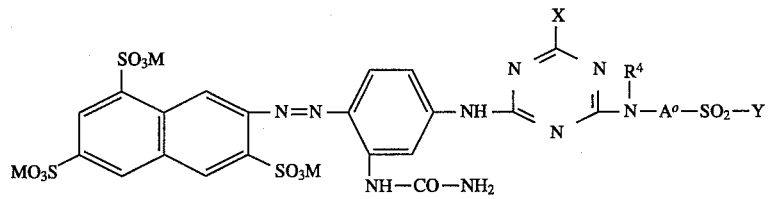

(1A)

where M, $R^4$ and Y have the abovementioned, especially preferred, meanings, A° is 1,2-ethylene or preferably 1,3-propylene, X is cyanoamino or methoxy.

Of the dyes of the formula (2) preference is given to the dyes of the formula (2A)

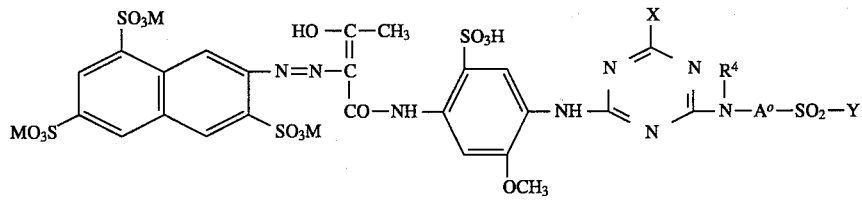

(2A)

where M, $R^4$ and Y have the abovementioned, especially preferred, meanings, A° is 1,2-ethylene or preferably 1,3-propylene, X is cyanoamino or methoxy.

Of the compounds of the formula (3) preference is given to the dyes of the formula (3A)

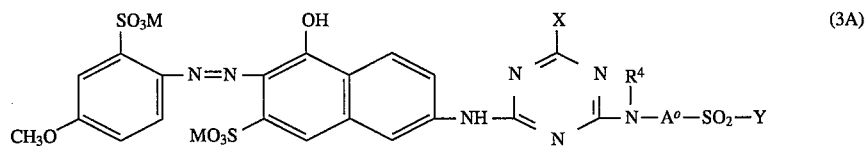

(3A)

where M, R⁴ and Y have the abovementioned, especially preferred, meanings, A° is 1,2-ethylene or preferably 1,3-propylene, X is cyanoamino or methoxy.

Of the compounds of the formula (4) preference is given to the compounds of the formula (4A)

propylene.

Of the dyes of the formula (7) preference is given to the dyes of the formula (7A)

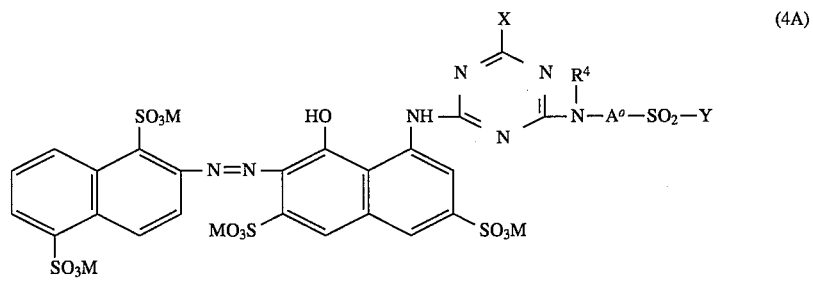

(4A)

where M, R⁴ and Y have the abovementioned, especially preferred, meanings, A° is 1,2-ethylene or preferably 1,3-propylene, X is cyanoamino or methoxy.

Of the compounds of the formula (5) preference is given to the compounds of the formula (5A)

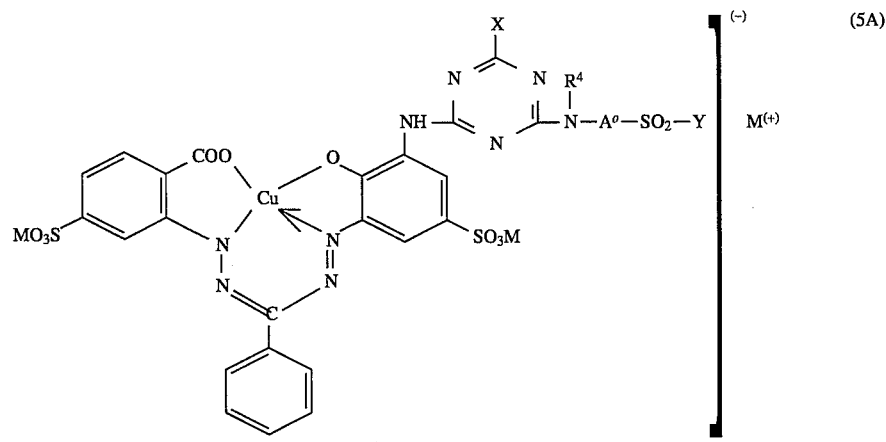

(5A)

where M, R⁴ and Y have the abovementioned, especially preferred, meanings, A° is 1,2-ethylene or preferably 1,3-propylene, X is cyanoamino or methoxy.

Of the compounds of the formula (6) preference is given to the compounds of the formula (6A)

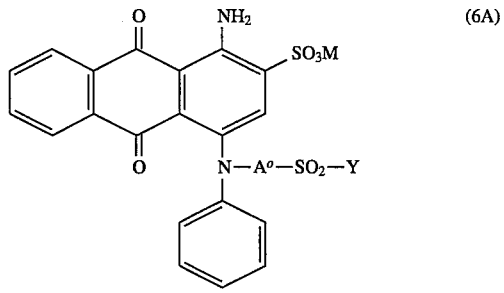

(6A)

where M and Y have the abovementioned, especially preferred, meanings, A° is 1,2-ethylene or preferably 1,3-

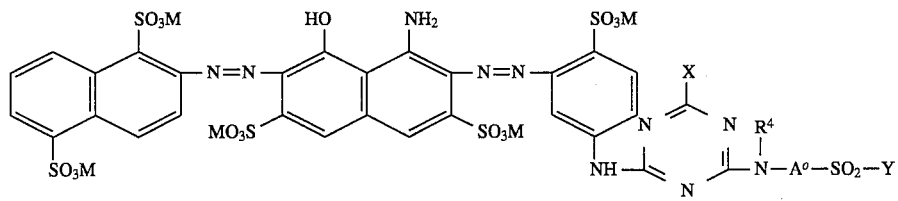

(7A)

where M, R[4] and Y have the abovementioned, especially preferred, meanings, A° is 1,2-ethylene or preferably 1,3-propylene, X is cyanoamino or methoxy.

The dye mixture can be prepared prior to its use for dyeing, by mechanical mixing of the individual dye components, or only in the dyeing liquors, dyebaths, print pastes, etc., by addition and admixture of the individual dye components in the course of the preparation of the dyeing liquors etc. The dye mixtures of the invention can be present in solid (e.g. granulated or pulverulent) form and also in aqueous solution as a liquid brand. The dye mixtures may contain inorganic salts, such as sodium sulfate and sodium chloride, dispersants, such as a napthalenesulfonic acid-formaldehyde condensation product, dustproofing agents, such as di-(2-ethylhexyl) terephthalate or an alkanediol of 4 to 8 carbon atoms, such as hexylene glycol, buffer substances capable of establishing a pH between 3 and 7, for example sodium acetate, sodium borate, sodium hydrogenphosphate and sodium citrate, water softeners, such as polyphosphates, or other customary dyeing assistants. The level of the individual dye components in the dye mixtures can vary within wide limits. Thus, the proportion of each dye can vary within the limits of 3 and 70% by weight, based on the total weight of all dyes, the total amount of all dyes coming to 100% by weight. Preferably the individual dye is present in the dye mixture within the limits of 3 and 40% by weight.

The dye mixtures of the invention can be used for dyeing in solid and liquid form in the manner customary for fiber-reactive dyes, preferably under the customary dyeing conditions known for trichromatic dyeing. The present invention therefore also relates to the use of the dye mixtures of the invention for dyeing hydroxyl- and/or carboxamido-containing fiber materials by applying the dye mixture in aqueous solution to the fiber material or incorporating it into the fiber material and fixing the dyes on the fiber material by means of heat or with the aid of an alkaline agent or by means of both measures. For the purposes of the present invention, the term "dyeing process" also comprehends the customary printing processes. The fiber materials can be used in the generally customary form, for example in the form of fabrics and yarns, as in the form of hanks and packages.

Hydroxyl-containing materials are natural or synthetic hydroxyl-containing materials, for example cellulose fiber materials or their regenerated products and polyvinyl alcohols. Cellulose fiber materials are preferably cotton but also other vegetable fibers, such as linen, hemp, jute and ramie fibers; regenerated cellulose fibers include for example staple viscose and filament viscose.

Carboxamido-containing materials include for example synthetic and natural polyamides and polyurethanes, in particular in the form of fibers, for example wool and other animal hairs, silk, leather, nylon-6,6, nylon-6, nylon-11 and nylon-4.

The dye mixtures of the invention can be applied to and fixed on the substrates mentioned by the techniques customary for water-soluble dyes, in particular for fiber-reactive dyes. For instance, on cellulose fibers they produce from a long liquor by the exhaust method and by means of various acid-binding agents with or without neutral salts, such as sodium chloride or sodium sulfate, dyeings having very good color yields and also excellent color build-up combined with high degrees of fixation. They are dyed at temperatures between 40° and 105° C., if desired at temperatures up to 120° C. under super-atmospheric pressure, and if desired in the presence in the aqueous bath of customary dyeing assistants. One possible procedure is to introduce the material into the warm bath and to gradually heat the bath to the desired dyeing temperature and to complete the dyeing process at that temperature. The neutral salts which speed up the exhaustion of the dye mixtures of the invention can if desired not be added to the bath until after the actual dyeing temperature has been reached.

The padding process likewise produces excellent color yields with high degrees of fixation and a very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste containing sodium carbonate or some other acid-binding agent as well as the dye mixture of the invention and by subsequent steaming at 100° to 103° C., or two-phase, for example by printing with a neutral or weakly acid print paste containing the colorant and subsequent fixation either by passing the printed material through a hot electrolyte-containing alkaline bath or by overpadding with an alkaline electrolyte-containing padding liquor with a subsequent hatching of this treated material or subsequent steaming or subsequent treatment with dry heat, produce strong prints with well-defined contours and a bright white ground. The appearance of the prints is not greatly affected by variations in the fixing conditions. Not: only in dyeing but also in printing, the degrees of fixation obtained with the dye mixtures of the invention are very high.

When fixing by means of dry heat in accordance with the customary thermofix processes, hot air from 120° to 200° C. is used. In addition to the customary steam at 101° to 103° C. it is also possible to use superheated steam and high-pressure steam at temperatures of up to 160° C.

The acid-binding agents which effect the fixation of the dye mixture of the invention on the cellulose fibers include for example water-soluble basic salts of the alkali metals and the alkaline earth metals of inorganic or organic acids as well as compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

By treating the dye mixtures of the invention with the acid-binding agents with or without heating, these compounds are chemically bonded to the cellulose fibers; especially the cellulose dyeings have after the customary aftertreatment by rinsing to remove unfixed portions of the dye mixtures of the invention excellent wetfastness properties, in particular since such unfixed portions are easily washed off on account of their good solubility in cold water.

The dyeings on polyurethane and polyamide fibers are customarily carried out from an acid medium. For instance, the dyebath may have added to it acetic acid and/or ammonium sulfate and/or acetic acid and ammonium acetate or sodium acetate in order to bring it to the desired pH. To achieve a usable levelness of the dyeing, it is advisable to add customary leveling aids, for example based on a reaction product of cyanuric chloride with three times the molar amount of an aminobenzenesulfonic acid and/or an aminonaphthalenesulfonic acid and/or based on a reaction product of for example stearylamine with ethylene oxide. Generally the material to be dyed is introduced at a temperature of about 40° C. into the bath, agitated therein for some time, the dyebath is then adjusted to the desired weakly acid, preferably weakly acetic acid, pH, and the actual dyeing is carried out at a temperature between 60° and 98° C. However, the dyeings can also be carried out at boiling point or at temperatures up to 120° C. (under super-atmospheric pressure).

The dyeings and prints prepared with the dye mixtures of the invention have a high color strength, good lightfastness and very good wetfastness properties, such as wash, milling, water, sea water, cross-dyeing and perspiration-fast properties, also good fastness to pleating, hot pressing and rubbing.

Of particular note are the high degrees of fixation achievable with the dye mixtures of the invention on cellulose fiber materials, which can be above 90% in the case of printing processes and pad-dyeing processes. A further advantage of the dye mixtures of the invention is the ease of washing off the portions which have not become fixed during printing or dyeing, as a result of which the washing of the printed or dyed cellulose fiber materials can be accomplished with low quantities of wash liquor with or without an energy-saving temperature regime during the washing process.

The examples which follow illustrate the invention. Parts and percentages are by weight, unless otherwise stated. Parts by weight relate to parts by volume as the kilogram relates to the liter.

The dyes described in the examples in terms of a formula may be indicated in the form of the free acid; generally they are used for dyeing in the form of their alkali metal salts, such as lithium, sodium or potassium salts. Similarly, the starting compounds and components mentioned in the form of the free acid in the following examples, in particular table examples, can be used in the synthesis as such or in the form of their salts, preferably alkali metal salts.

EXAMPLE 1

100 parts of a knitted cotton fabric are recirculated in a winch beck in 1500 parts of water at 60° C. Then the following dye salts are added:

0.8 part of the dye of the formula (1A) where X is cyanoamino, A° is 1,3-propylene, $R^4$ is hydrogen and Y is β-sulfatoethyl;

0.8 part of the dye of the formula (2A) where X is cyanoamino, A° is 1,3-propylene, $R^4$ is ethyl and Y is β-sulfatoethyl;

0.5 part of the dye of the formula (3A) where X is cyanoamino, A° is 1,3-propylene, $R^4$ is ethyl and Y is β-sulfatoethyl;

1.1 parts of the dye of the formula (4A) where X is cyanoamino, A° is 1,3-propylene, $R^4$ is hydrogen and Y is β-sulfatoethyl;

0.2 part of the dye of the formula (5A) where X is cyanoamino, A° is 1,3-propylene, $R^4$ is ethyl and Y is β-sulfatoethylsulfonyl;

0.6 part of the dye of the formula (6A) where A° is 1,3propylene and Y is β-sulfatoethyl;

0.6 part of the dye of the formula (7A) where X is cyanoamino, A° is 1,3-propylene, $R^4$ is hydrogen and Y is β-sulfatoethyl;

also added are 75 parts of sodium sulfate.

The fabric is initially circulated in this dyeing liquor at 60° C. for 20 minutes. Then 30 parts of sodium carbonate are added, and the dyeing is continued at 60° C. for a further 60 minutes.

The dyeing obtained is aftertreated and finished in a conventional manner by rinsing with water, by rinsing in an aqueous bath containing a small amount of acetic acid, by renewed rinsing with water, by boiling treatment in an aqueous bath containing a nonionic detergent, by renewed rinsing with water and drying. The dyeing shows a uniformly reddish deep brown shade which is free of any unlevelness. It also has good light, perspiration light, chlorinated water and wash fastness properties. Dyeings with the same shade and fastness properties are obtained on repeating the dyeing process under the stated conditions.

EXAMPLE 2

100 parts of a knitted staple viscose fabric are treated for 20 minutes at 60° C. in a jet dyeing machine in an aqueous dye solution containing:

0.1 part of the dye of the formula (1A) where X is cyanoamino, A° is 1,3-propylene, $R^4$ is ethyl and Y is β-sulfatoethyl, 0.3 part of the dye of the formula (2A) where X is cyanoamino, A° is 1,3-propylene, $R^4$ is hydrogen and Y is β-sulfatoethyl, 0.2 part of the dye of the formula (3A) where X is cyanoamino, A° is 1,3-propylene, $R^4$ is hydrogen and Y is β-sulfatoethyl, 0.2 part of the dye of the formula (4A) where X is cyanoamino, A° is 1,3-propylene, $R^4$ is hydrogen and Y is β-sulfatoethyl, 0.9 part of the dye of the formula (5A) where X is cyanoamino, A° is 1,3-propylene, $R^4$ is hydrogen and Y is β-sulfatoethyl, 0.9 part of the dye of the formula (6A) where A° is 1,3-propylene and Y is β-sulfatoethyl and 0.4 part of 7-acetylamino-8-naphthol-3-sulfonate (sodium) and 20 parts of sodium sulfate. Then the dyeing solution has added to it 2.5 parts of sodium carbonate and 0.5 part by volume of an aqueous 38 Bé, sodium hydroxide solution and the fabric is treated in this dyeing liquor at 60° C. for a further 40 minutes.

The dyeing obtained is aftertreated and finished in a conventional manner by rinsing with water, by rinsing in an aqueous bath containing a small amount of acetic acid, by renewed rinsing with water, by boiling treatment in an aqueous bath containing a nonionic detergent, by renewed rinsing with water and drying. The dyeing shows a uniformly reddish bluish gray shade which is free of any unlevelness. It also has good light, perspiration light, chlorinated water and wash fastness properties and is reproducibly obtainable in this quality with further dyeing batches.

EXAMPLE 3

100 parts of a cotton yarn are treated by a sandwich dyeing technique for 30 minutes at 65° C. in a liquor ratio of 10:1 with a dyeing liquor containing 1.6 parts of the dye of the formula (1A) where X is cyanoamino, A° is 1,3-propylene, $R^4$ is ethyl and Y is β-sulfatoethyl, 0.4 part of the dye of the formula (3A) where X is cyanoamino, A° is 1,3-propylene, $R^4$ is hydrogen and Y is β-sulfatoethyl, 0.2 part of the dye of the formula (4A) where X is cyanoamino, A° is 1,3-propylene, $R^4$ is ethyl and Y is vinyl, 0.4 part of the dye of the formula (5A) where X is cyanoamino, A° is 1,3-propylene, $R^4$ is hydrogen and Y is vinyl, 0.2 part of the dye of the formula (6A) where A° is 1,3-propylene and Y is β-sulfatoethyl, 0.4 part of the dye of the formula (7A) where X is cyanoamino, A° is ethylene, $R^4$ is ethyl and Y is β-sulfatoethyl, and 50 parts of sodium chloride. Thereafter 10 parts of trisodium phosphate are added, and the dyeing process is completed in the course of a further 60 minutes at 60° C.

The dyed yarn obtained is aftertreated and finished in a conventional manner by rinsing and washing. The yarn has a uniformly deep dark green color, there being no noticeable differences in shade between the outer and the inner layers of the sandwich. The dyeing also has good light, perspiration light, chlorinated water and wash fastness properties. Repeating the dyeing process leads to a similar result.

EXAMPLE 4

100 parts of a knitted cotton fabric are treated at 60° C. in a liquor ratio of 15:1 for 20 min in a winch beck with an aqueous dyeing liquor containing 0.1 part of the dye of the formula (1A) where X is cyanoamino, A° is 1,3-propylene, $R^4$ is ethyl and Y is β-sulfatoethyl, 0.1 part of the dye of the formula (2A) where X is cyanoamino, $R^4$ is hydrogen, A° is 1,3-propylene and Y is vinyl, 0.3 part of the dye of the formula (8)

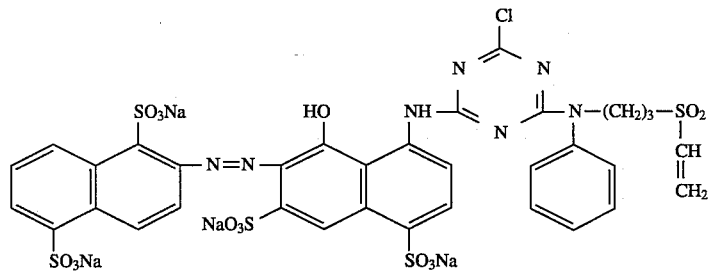

(8)

1.5 parts of the dye of the formula (6A) where A° is 1,3-propylene and Y is β-sulfatoethyl, 0.9 part of the dye of the formula (7A) where X is cyanoamino, $R^4$ is ethyl, A° is 1,3-propylene and Y is β-sulfatoethyl and parts of sodium sulfate. Thereafter 30 parts of sodium carbonate are added, and the dyeing is continued at 60° C. for a further 60 minutes.

The dyeing obtained shows after conventional aftertreatment a uniform, bluish gray shade free of any unlevelness whatsoever, with good light, perspiration light, chlorinated water and wash fastness properties.

EXAMPLE 5

12 parts of a dye of the formula (1A) where X is cyanoamino, A° is 1,3-propylene, $R^4$ is hydrogen and Y is β-sulfatoethyl, 3 parts of a dye of the formula (2A) where X is cyanoamino, A° is 1,3-propylene, $R^4$ is ethyl and Y is β-sulfatoethyl, 12 parts of the dye of the formula (3A) where X is cyanoamino, A° is 1,3-propylene, $R^4$ is ethyl and Y is β-sulfatoethyl, 8 parts of the dye of the formula (4A) where X is cyanoamino, A° is 1,3-propylene, $R^4$ is hydrogen and Y is β-sulfatoethyl, 0.15 part of the dye of the formula (5A) where X is cyanoamino, A° is 1,3-propylene, $R^4$ is ethyl and Y is β-sulfatoethylsulfonyl, 0.4 part of the dye of the formula (6A) where A° is 1,3-propylene and Y is β-sulfatoethyl and 0.45 part of the dye of the formula (7A) where X is cyanoamino, A° is 1,3-propylene, $R^4$ is hydrogen and Y is β-sulfatoethyl, are dissolved together in about 400 parts by volume of hot water. The dye solution is cooled down to 25° C. and then has added to it 1 part of sodium alginate, 10 parts of sodium m-nitrobenzenesulfonate and 20 parts of sodium bicarbonate, and the dye solution obtained is made up with water to 1000 parts by volume. This dye solution, which has a temperature of about 25° C., is immediately used after it has been prepared to pad a woven cotton fabric which is subsequently initially dried at 120° C. for two minutes and then treated for five minutes with steam at 100° C. to fix the dyes.

The dyed fabric shows a uniformly reddish brown shade and an excellent color build-up, also good light, perspiration light, chlorinated water and wash fastness properties. Repeating the dyeing process under the stated conditions gives a dyeing of the same quality and the same shade.

EXAMPLE 6

21 parts of the dye of the formula (1A) where X is cyanoamino, A° is 1,3-propylene, $R^4$ is hydrogen and Y is β-sulfatoethyl, 6 parts of the dye of the formula (2A) where X is cyanoamino, A° is 1,3-propylene, $R^4$ is hydrogen and Y is β-sulfatoethyl, 21 parts of the dye of the formula (3A) where X is cyanoamino, A° is 1,3-propylene, $R^4$ is hydrogen and Y is β-sulfatoethyl, 6 parts of the dye of the formula (4A) where X is cyanoamino, A° is 1,3-propylene, $R^4$ is hydrogen and Y is β-sulfatoethyl, 3 parts of the dye of the formula (5A) where X is cyanoamino, A° is 1,3-propylene, $R^4$ is hydrogen and Y is β-sulfatoethyl and 33 parts of the dye of the formula (6A) where A° is 1,3-propylene and Y is β-sulfatoethyl are dissolved together in about 400 parts by volume of hot water; 20 parts of sodium alginate, 10 parts of sodium m-nitrobenzenesulfonate and 20 parts of sodium bicarbonate are added to the dye solution which has been cooled down to 20° C. and which is then made up with water to 1000 parts by volume. This print paste is then used, immediately after it has been prepared, to print a woven cotton fabric at 20° C.; the print is initially dried and then treated with steam at 100° C. for 5 minutes to fix the dyes on the fabric. The colored print obtained is finished in a conventional manner by rinsing and washing. The result is a uniformly deeply orange pattern showing excellent color build-up. The quality of the print and of the hue is satisfactorily reproducible on repeating the stated conditions.

EXAMPLE 7

Example 1 is repeated using not the dyes specified there but in addition to 75 parts of sodium sulfate the following dye mixture:

- 0.5 part of the dye of the formula (1A) where X is cyanoamino, $R^4$ is hydrogen, A° is 1,3-propylene and Y is vinyl;
- 0.02 part of the dye of the formula (2A) where X is cyanoamino, $R^4$ is ethyl, A° is 1,3-propylene and Y is vinyl;
- 0.1 part of the dye of the formula (3A) where X is cyanoamino, $R^4$ is hydrogen, A° is 1,3-propylene and Y is vinyl;
- 1.6 parts of the dye of the formula (4A) where X is cyanoamino, $R^4$ is hydrogen, A° is 1,3-propylene and Y is β- sulfatoethyl;
- 0.1 part of the dye of the formula (5A) where X is cyanoamino, $R^4$ is hydrogen, A° is 1,3 -propylene and Y is β-sulfatoethyl;
- 0.05 part of the dye of the formula (6A) where A° is 1,3-propylene and Y is β-sulfatoethyl;
- 0.05 part of the dye of the formula (7A) where X is cyanoamino, $R^4$ is hydrogen, A° is 1,3-propylene and Y is vinyl.

The result obtained is an evenly, uniformly dyed yarn having a reddish purple color.

EXAMPLE 8

Example 1 is repeated using not the dyes specified there but in addition to 75 parts of sodium sulfate the following dye mixture:

- 0.83 part of the dye of the formula (1A) where X is cyanoamino, $R^4$ is hydrogen, A° is 1,3-propylene and Y is vinyl;
- 0.03 part of the dye of the formula (2A) where X is cyanoamino, $R^4$ is hydrogen, A° is 1,3-propylene and Y is vinyl;
- 0.02 part of the dye of the formula (3A) where X is cyanoamino, $R^4$ is hydrogen, A° is 1,3-propylene and Y is β-sulfatoethyl;
- 0.41 part of the dye of the formula (4A) where X is cyanoamino, $R^4$ is hydrogen, A° is 1,3-propylene and Y is vinyl;
- 1.2 parts of the dye of the formula (5A) where X is cyanoamino, $R^4$ is hydrogen, A° is 1,3-propylene and Y is β-sulfatoethyl;
- 0.06 part of the dye of the formula (6A) where A° is 1,3-propylene and Y is vinyl;
- 0.08 part of the dye of the formula (7A) where X is cyanoamino, $R^4$ is hydrogen, A° is 1,3-propylene and Y is β-sulfatoethyl.

The result obtained is an evenly, uniformly dyed yarn having a gray shade.

EXAMPLE 9

Example 1 is repeated using not the dyes specified there but in addition to 75 parts of sodium sulfate the following dye mixture:

- 1.1 parts of the dye of the formula (1A) where X is cyanoamino, $R^4$ is hydrogen, A° is 1,3-propylene and Y is β-sulfatoethyl;
- 1.6 parts of the dye of the formula (2A) where X is cyanoamino, $R^4$ is hydrogen, A° is 1,3-propylene and Y is β-sulfatoethyl;
- 0.01 part of the dye of the formula (3A) where X is cyanoamino, $R^4$ is hydrogen, A° is 1,3-propylene and Y is vinyl;
- 0.01 part of the dye of the formula (4A) where X is cyanoamino, $R^4$ is hydrogen, A° is 1,3-propylene and Y is vinyl;
- 0.06 part of the dye of the formula (5A) where X is cyanoamino, $R^4$ is hydrogen, A° is 1,3-propylene and Y is vinyl;
- 0.6 part of the dye of the formula (6A) where A° is 1,3-propylene and Y is β-sulfatoethyl;
- 2.3 parts of the dye of the formula (7A) where X is cyanoamino, $R^4$ is hydrogen, A° is 1,3-propylene and Y is vinyl.

The result obtained is an evenly, uniformly dyed yarn having a deep green shade.

EXAMPLE 10

Example 1 is repeated using not the dyes specified there but in addition to 75 parts of sodium sulfate the following dye mixture:

- 0.15 part of the dye of the formula (1A) where X is cyanoamino, $R^4$ is hydrogen, A° is 1,3-propylene and Y is vinyl;
- 0.01 part of the dye of the formula (2A) where X is cyanoamino, $R^4$ is hydrogen, A° is 1,3-propylene and Y is vinyl;
- 0.02 part of the dye of the formula (3A) where X is cyanoamino, $R^4$ is hydrogen, A° is 1,3-propylene and Y is vinyl;
- 0.32 part of the dye of the formula (4A) where X is cyanoamino, $R^4$ is hydrogen, A° is 1,3-propylene and Y is vinyl;
- 0.2 part of the dye of the formula (5A) where X is cyanoamino, $R^4$ is hydrogen, A° is 1,3-propylene and Y is vinyl;
- 3.1 parts of the dye of the formula (6A) where A° is 1,3-propylene and Y is β-sulfatoethyl;
- 0.15 part of the dye of the formula (7A) where X is cyanoamino, $R^4$ is hydrogen, A° is 1,3-propylene and Y is vinyl.

17

The result obtained is an evenly, uniformly dyed yarn having a reddish blue shade.

EXAMPLE 11

100 parts of a knitted filament viscose fabric are brought together in a jet dyeing apparatus at a liquor ratio of 6:1 with a hot aqueous solution at 60° C. of a dye preparation of the following composition:

- 0.04 part of the dye of the formula (1A) where X is cyanoamino, $R^4$ is ethyl, $A°$ is 1,3-propylene and Y is β-sulfatoethyl;
- 0.43 part of the dye of the formula (2A) where X is cyanoamino, $R^4$ is hydrogen, $A°$ is 1,3-propylene and Y is β-sulfatoethyl;
- 0.1 part of the dye of the formula (3A) where X is cyanoamino, $R^4$ is hydrogen, $A°$ is 1,3-propylene and Y is β-sulfatoethyl;
- 0.02 part of the dye of the formula (4A) where X is cyanoamino, $R^4$ is hydrogen, $A°$ is 1,2-ethylene and Y is β-sulfatoethyl;
- 0.09 part of the dye of the formula (5A) where X is cyanoamino, $R^4$ is hydrogen, $A°$ is 1,3-propylene and Y is vinyl;
- 0.03 part of the dye of the formula (7A) where X is cyanoamino, $R^4$ is hydrogen, $A°$ is 1,3-propylene and Y is vinyl;
- 0.5 part of a methylnaphthalenesulfonic acid-formaldehyde condensation product.

The fabric is initially treated for 20 minutes with this hot dye solution at 60° C., and then 2.5 parts of sodium carbonate and 0.5 part by volume of an aqueous, 38° Bé sodium hydroxide solution are added to the solution. The dyeing process is continued at 60° C. for 40 minutes, the dyed material is then removed from the apparatus and finished in a conventional manner by rinsing and washing. The result obtained is an orange dyeing of even shade without any shadowing; the dyeing also has an excellent color build-up with good light, perspiration light, chlorinated water and wash fastness properties. Repeating the dyeing process under the stated conditions leads to dyeings having the same shade and the stated good fastness properties.

What is claimed is:

1. A dye mixture consisting essentially of three to seven fiber-reactive dyes selected from dyes of the below-indicated and -defined formulae (1) to (7) with the proviso that the dye mixture contain at least one representative of the formulae (1) or (2) or a combination thereof, at least one representative of the formulae (3) or (4) or a combination thereof, and at least one representative of the formulae (5), (6) or (7) or a combination thereof:

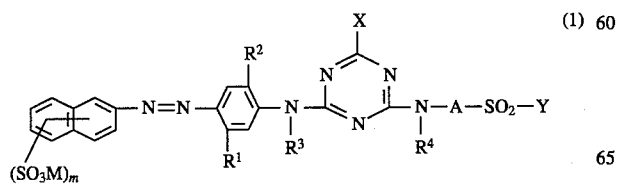
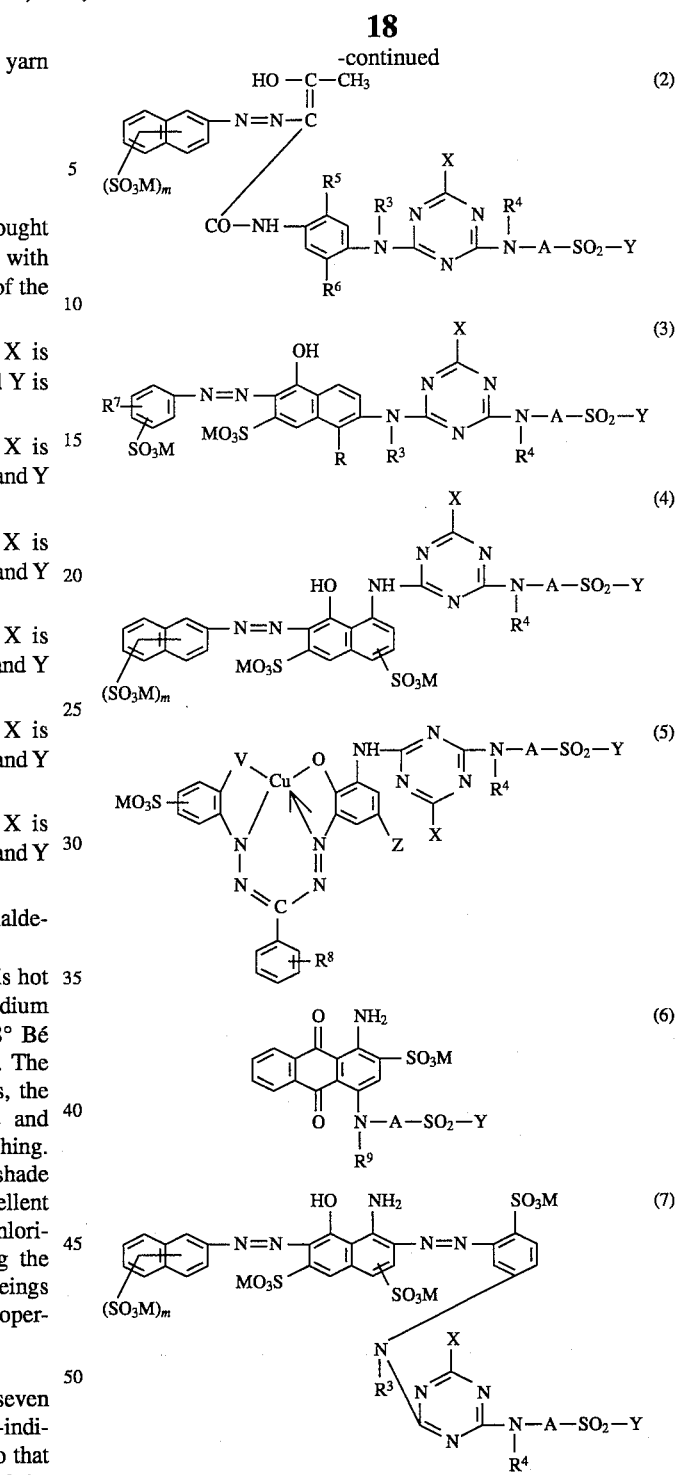

where

M is hydrogen or an alkali metal;

m is 1, 2 or 3;

X is cyanoamino, alkoxy of 1 to 4 carbon atoms or alkoxy of 2 to 4 carbon atoms substituted by alkoxy of 1 to 4 carbon atoms;

Y is vinyl or is ethyl which contains in the β-position a substituent which is eliminable by alkali with the formation of the vinyl group;

Z is hydrogen or $SO_3M$, wherein M is defined above;

$R^1$ is hydrogen, alkyl of 1 to 4 carbon atoms, alkoxy or 1 to 4 carbon atoms, alkanoylamino of 2 to 5 carbon atoms, or ureido;

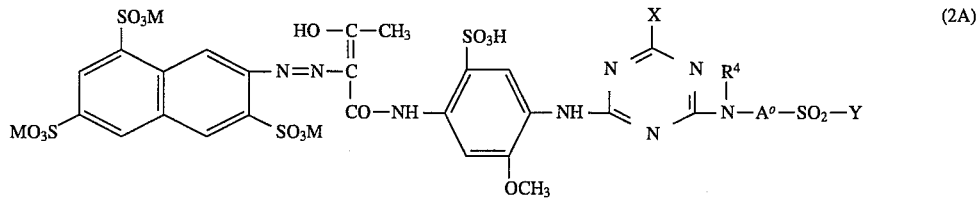

$R^2$ is hydrogen, sulfo, alkyl of 1 to 4 carbon atoms, or alkoxy of 1 to 4 carbon atoms;

$R^3$ is hydrogen or alkyl of 1 to 4 carbon atoms, which can be substituted by hydroxyl, cyano, $C_1-C_4$-alkoxy, carboxyl, carbamoyl, $C_2-C_5$-alkoxycarbonyl, $C_2-C_5$-alkyl carbonyloxy, sulfo, sulfamoyl or halogen;

$R^4$ is hydrogen or alkyl of 1 to 4 carbon atoms, which can be substituted by hydroxyl, cyano, $C_1-C_4$-alkoxy, carboxyl, carbamoyl, $C_2-C_5$-alkoxycarbonyl, $C_2-C_5$-alkyl carbonyloxy, sulfo, sulfamoyl or halogen or is phenyl which can be substituted by 1 to 2 substituents selected from the group consisting of sulfo, methyl, ethyl, methoxy, ethoxy and carboxyl;

A is alkylene of 2 to 6 carbon atoms, which can be substituted by hydroxyl, $C_1-C_4$-alkoxy, sulfo, carboxyl or halogen;

R is hydrogen or sulfo;

$R^5$ is hydrogen, sulfo, alkyl of 1 to 4 carbon atoms or alkoxy of 1 to 4 carbon atoms;

$R^6$ is hydrogen, sulfo, alkyl of 1 to 4 carbon atoms or alkoxy of 1 to 4 carbon atoms;

$R^7$ is hydrogen, alkyl of 1 to 4 carbon atoms or alkoxy of 1 to 4 carbon atoms;

V is a group of the formula —CO—O— or an oxy group of the formula —O—;

$R^8$ is hydrogen, methyl, ethyl, nitro, sulfo or chlorine;

$R^9$ is phenyl, monosulfophenyl or monocarboxylphenyl; the one —$SO_3M$ group in the formula (4) and in the formula (7) is attached to the naphthalene nucleus of the aminonaphthol radical meta or para to the amino group.

2. The dye mixture of claim 1 consisting essentially of four to seven fiber-reactive dyes of the indicated kind.

3. The dye mixture of claim 1 wherein the dye of the formula (1) is a dye of the formula (1A)

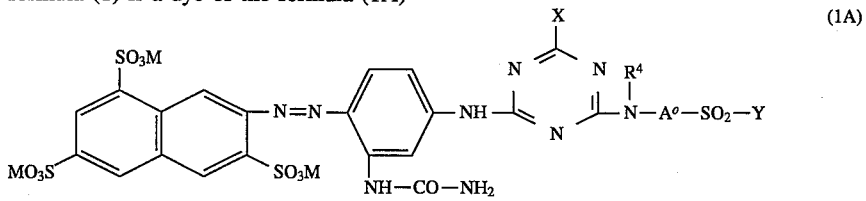

where M, X, $R^4$ and Y are each as defined in claim 1 and $A^o$ is alkylene of 2 or 3 carbon atoms which can be substituted by hydroxyl, $C_1-C_4$-alkoxy, sulfo, carboxyl or halogen.

4. The dye mixture of claim 1 wherein the dye of the formula (2) is a dye of the formula (2A)

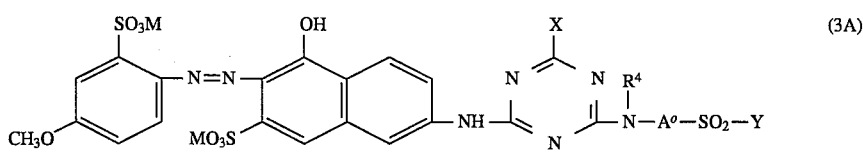

where M, X, $R^4$ and Y are each as defined in claim 1 and $A^o$ is alkylene of 2 or 3 carbon atoms which can be substituted by hydroxyl, $C_1-C_4$-alkoxy, sulfo, carboxyl or halogen.

5. The dye mixture of claim 1 wherein the dye of the formula (3) is a dye of the formula (3A)

where M, X, $R^4$ and Y are each as defined in claim 1 and $A^o$ is alkylene of 2 or 3 carbon atoms which can be substituted by hydroxyl, $C_1-C_4$-alkoxy, sulfo, carboxyl or halogen.

6. The dye mixture of claim 1 wherein the dye of the formula (4) is a dye of the formula (4A)

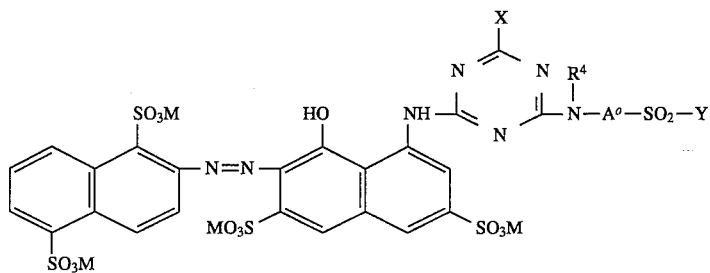

(4A)

where M, X, $R^4$ and Y are each as defined in claim 1 and $A°$ is alkylene of 2 or 3 carbon atoms which can be substituted by hydroxyl, $C_1$–$C_4$-alkoxy, sulfo, carboxyl or halogen.

7. The dye mixture of claim 1, wherein the dye of the formula (5) is a dye of the formula (5A)

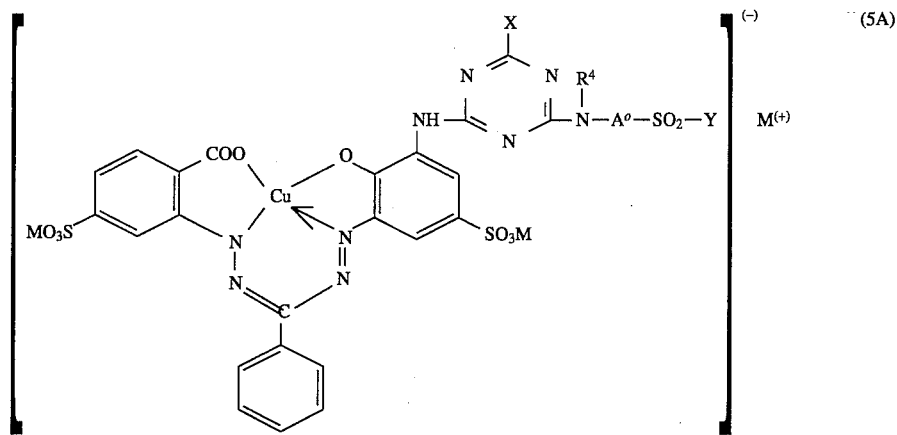

(5A)

where M, X, $R^4$ and Y are each as defined in claim 1 and $A°$ is alkylene of 2 or 3 carbon atoms which can be substituted by hydroxyl, $C_1$–$C_4$-alkoxy, sulfo, carboxyl or halogen.

8. The dye mixture of claim 1 wherein the dye of the formula (6) is a dye of the formula (6A)

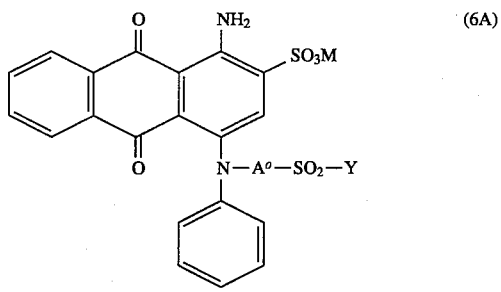

(6A)

where M and Y are each as defined in claim I and $A°$ is alkylene of 2 or 3 carbon atoms which can be substituted by hydroxyl, $C_1$–$C_4$-alkoxy, sulfo, carboxyl or halogen.

9. The dye mixture of claim 1 wherein the dye of the formula (7) is a dye of the formula (7A)

where M, X, $R^4$ and Y are each as defined in claim 1 and $A°$ is alkylene of 2 or 3 carbon atoms which can be substituted by hydroxyl, $C_1$–$C_4$-alkoxy, sulfo, carboxyl or halogen.

10. The dye mixture of claim 1 wherein X is cyanoamino or methoxy.

11. The dye mixture of claim 3 wherein $A°$ is 1,2-ethylene or 1,3-propylene.

12. The dye mixture of claim 4 wherein $A°$ is 1,2-ethylene or 1,3-propylene.

13. The dye mixture of claim 5 wherein $A°$ is 1,2-ethylene or 1,3-propylene.

14. The dye mixture of claim 6 wherein $A°$ is 1,2-ethylene or 1,3-propylene.

15. The dye mixture of claim 7, wherein $A°$ is 1,2-ethylene or 1,3-propylene.

16. The dye mixture of claim 8 wherein $A°$ is 1,2-ethylene or 1,3-propylene.

17. The dye mixture of claim 9 wherein $A°$ is 1,2-ethylene or 1,3-propylene.

18. The dye mixture of claim 1 wherein $R^4$ is hydrogen, methyl, ethyl or phenyl.

19. A method for dyeing a fiber material containing hydroxyl groups, carboxyamido groups or both of them comprising dyeing the fiber material with a dye mixture of claim 1.

20. A process for dyeing a fiber material containing hydroxyl groups, carboxamido groups or both of them by

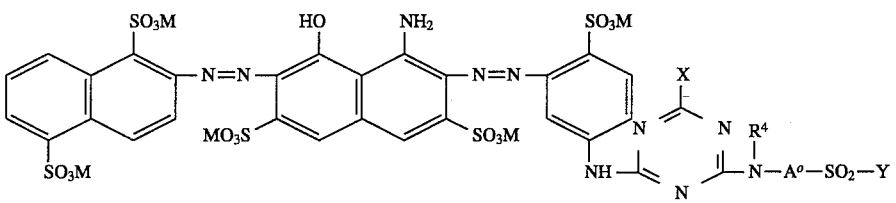

(7A)

applying to the material a dye or a mixture of dyes and fixing the dyes onto the fiber material by means of heat or with the aid of an alkaline agent or by means of heat and with the aid of an alkaline agent, which comprises applying to and fixing on the fiber material a dye which is a dye mixture as claimed in claim 1.

* * * * *